United States Patent
Buchholz et al.

(10) Patent No.: US 6,362,266 B1
(45) Date of Patent: Mar. 26, 2002

(54) PROCESS FOR REDUCING COHESIVENESS OF POLYALLYLAMINE POLYMER GELS DURING DRYING

(75) Inventors: Fredric L. Buchholz; Thomas L. Staples; Christopher M. Chappelow, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/390,509

(22) Filed: Sep. 3, 1999

(51) Int. Cl.$^7$ .................................................. C08K 5/10
(52) U.S. Cl. ........................ 524/318; 524/555; 525/292; 525/328.2; 525/359.3; 525/385
(58) Field of Search ................. 524/318, 555; 525/328.2, 359.3, 385, 292

(56) References Cited

U.S. PATENT DOCUMENTS

| | | | |
|---|---|---|---|
| 4,528,347 A | 7/1985 | Harada et al. | 526/219 |
| 4,605,701 A | 8/1986 | Harada et al. | 525/107 |
| 4,885,247 A | 12/1989 | Datta | 435/139 |
| 5,496,545 A | 3/1996 | Holmes-Farley et al. | 424/78.11 |
| 5,607,669 A | 3/1997 | Mandeville, III et al. | 424/78.12 |
| 5,618,530 A | 4/1997 | Mandeville, III et al. | 424/78.12 |
| 5,679,717 A | 10/1997 | Mandeville, III et al. | 514/742 |
| 5,693,675 A | 12/1997 | Mandeville, III et al. | 514/742 |
| 5,702,696 A | 12/1997 | Mandeville, III et al. | 424/78.12 |
| 6,121,411 A | * 9/2000 | Sartori et al. | 528/502 |

FOREIGN PATENT DOCUMENTS

| | | |
|---|---|---|
| DE | 4227019 A1 | 2/1994 |
| EP | 732352 A1 | 9/1996 |
| JP | 05244915 | 9/1993 |
| JP | 07309766 A | 11/1995 |
| JP | 08134134 A * | 5/1996 |
| WO | WO96/21454 | 7/1996 |
| WO | WO98/57652 | 12/1998 |

OTHER PUBLICATIONS

Encyclopedia of Polymer Science and Engineering, 1988, vol. 8, pp. 342–393.
Chang, J. App. Electrochem, 9, 731–736 (1979).
J. D. McLean, V. A. Stenger, R. E. Reim, M. W. Long and T. A. Hiller, Anal. Chem., 50, 1309–1312 (1978).
Encyclopedia of Polymer Science and Engineering, 1988, vol. 17, pp. 75–107.
Voss, J. Membrane Sci., 27, 165–171 (1986).
Hwang and Kammermeyer, Techniques of Chemistry, Wiley, vol. VII, 492–495 (1975).

* cited by examiner

Primary Examiner—Bernard Lipman

(57) ABSTRACT

Disclosed is a cross-linked polyallylamine polymer composition having reduced cohesiveness, a process for producing a cross-linked polyallylamine polymer having reduced cohesiveness from an aqueous solution of a washed cross-linked polyallylamine polymer treated with a surfactant and to cross-linked polyallylamine polymer compositions produced thereby.

19 Claims, No Drawings

PROCESS FOR REDUCING COHESIVENESS OF POLYALLYLAMINE POLYMER GELS DURING DRYING

FIELD OF THE INVENTION

This invention relates to a process for producing a polyallylamine polymer gel having reduced cohesiveness during drying and to cross-linked polyallylamine polymer gel compositions produced thereby.

BACKGROUND OF THE INVENTION

Cross-linked polyallylamine polymers have found many therapeutic applications. See for example, WO 98/57652, JP 07309766-A and U.S. Pat. Nos. 5,618,530, 5,679,717, 5,693,675 and 5,607,669 for reducing blood cholesterol levels by reducing reabsorption of bile acids, U.S. Pat. No. 5,702,696 for decreasing the absorption of dietary iron from the gastrointestinal track, and WO 96/21454 and U.S. Pat. No. 5,496,545 for removing phosphate from the gastrointestinal track. Further, JP 05244915 discloses the use of cross-linked polyamine polymers as food preservatives.

Methods to produce cross-linked polyamine polymers are known. See for example, the references cited above and U.S. Pat. No. 4,605,701, DE 4227019 A1 and EP 732352 A1, the disclosures of which are incorporated herein by reference. These references disclose cross-linking the polyallylamine polymer by reacting the polymer with a suitable cross-linking agent in aqueous caustic solution or an aqueous caustic solution and immiscible solvent mixture.

The existing methods to produce cross-linked polyamine polymers create difficult and costly handling and cleanup procedures, especially in an industrial. production process. In all cases, once the polymer gel is dried to a certain volatile content (dependent on temperature), it becomes extremely cohesive and sticks to itself. This cohesive phase results in a significantly increased power requirement to agitate the polymer and a decreased heat transfer efficiency from the heated dryer shell. The present invention addresses these problems and gives a more practical solution to them.

SUMMARY OF THE INVENTION

The present invention is directed to a process for producing a cross-linked polyallylamine polymer gel having reduced cohesiveness during drying comprising the steps of reacting an aqueous solution of a polyallylamine polymer with a multifunctional cross-linking agent, preferably epichlorohydrin, to give a cross-linked polyallylamine polymer.

One embodiment of the present invention comprises the step of washing the cross-linked polyallylamine polymer with an alcohol or alcohol/water solution.

In a further embodiment, the present invention comprises the step of drying the cross-linked polyallylamine polymer.

In yet a further embodiment, the present invention involves the use of a reactor designed for high viscosity processing, preferably a LIST reactor, in the cross-linking and/or drying steps.

In yet a further embodiment, the present invention involves compositions of cross-linked polyallylamine polymers produced by the foregoing process.

DETAILED DESCRIPTION OF THE EMBODIMENTS

The present invention provides a process for producing a cross-linked, water-insoluble but swellable polyallylamine polymer that has decreased cohesiveness during drying. The process comprises subjecting a portion of the amino groups present in an aqueous solution of polyallylamine polymer to a cross-linking reaction with a compound having, in its molecule, at least two functional groups reactive with primary amino groups, as well as providing said cross-linked polyallylamine polymers.

The polyallylamine acid salt polymer used in the present invention is well known from references cited above and U.S. Pat. No. 4,528,347, the disclosure of which is incorporated herein by reference. Generally, monoallylamine is polymerized as a monomer inorganic acid salt (e.g., hydrochloride, sulfate, etc.) of monoallylamine in the presence of an azo type radical initiator. The polyallylamine acid salt polymer used in the invention typically has a weight average molecular weight ("$MW_w$") greater than about 2,000 daltons and more preferably greater than about 20,000 daltons. The polyallylamine polymer used in the invention typically has a $MW_w$ less than or equal to about 200,000 daltons and more preferably less than or equal to about 100,000 daltons. Polyallylamine hydrochloride polymer, the polymerization product from the hydrochloric acid salt of monoallylamine, is a preferred polyallylamine acid salt polymer.

Preferably, the polyallylamine acid salt polymer is neutralized prior to cross-linking. The neutralized polyallylamine polymer is sometimes referred to as polyallylamine polymer. The aqueous solution of polyallylamine polymer used in the invention is prepared by dissolving a polyallylamine acid salt polymer (obtained by the process described above) into water or other suitable solvent. Neutralization can be accomplished with any suitable base such as ammonium hydroxide, preferably sodium hydroxide, by ion exchange, electrodeionization or by other suitable methods.

Neutralization of an aqueous solution of polyallylamine hydrochloride polymer by a suitable base (e.g., lithium hydroxide, potassium hydroxide, sodium hydroxide, etc.) provides an aqueous solution of polyallylamine polymer with high levels of salt (e.g., sodium chloride). However, means to remove salt, for example, ion exchange, dialysis, nanofiltration or ultrafiltration may be used to provide the aqueous solution of polyallylamine polymer of the present invention.

Preferably, reducing the level of salt in polyallylamine polymer to provide a reduced salt polyallylamine polymer is done by ultrafiltration. Ultrafiltration is a pressure driven filtration separation occurring on a molecular scale and is well known in the art. Typically, a process fluid containing dissolved and/or suspended material contacts one side of a porous membrane. A pressure gradient is applied across the membrane. The liquid, including small dissolved molecules (e.g., unreacted allylamine and low molecular weight polyallylamine polymer) and ions (e.g., the salt) are forced through the pores. Sieving retains colloids, suspended solids, and large dissolved molecules (e.g., the polyallylamine polymer). A good discussion of ultrafiltration is contained in *Encyclopedia of Polymer Science and Engineering*, 1988, Volume 17, pp. 75–107, the entire disclosure of which is incorporated herein by reference.

A complete neutralization of the polyallylamine acid salt polymer prior to cross-linking is not always necessary. Depending on its intended use, a partial neutralization is also allowable and often desirable to give the desired level of cross-linking, pH, properties and efficacy for the cross-linked polyallylamine polymer. Preferably, the polyallylamine acid salt polymer is neutralized to a point where at least about 50 percent, more preferably at least about 60 percent, even more preferably at least about 65 percent, even more preferably at least about 70 percent, and most preferably at least about 71 percent of the amino groups in the polyallylamine acid salt polymer are neutralized. Preferably, the polyallylamine acid salt polymer is neutralized whereby about 100 percent, more preferably no more than about 90 percent, more preferably no more than about 80 percent, even more preferably no more than about 75 percent, even more preferably no more than about 73 percent, and most preferably about 72 percent of the amino groups in the polyallylamine acid salt polymer are neutralized.

Preferably, the aqueous solution of polyallylamine polymer is concentrated following neutralization and prior to cross-linking by any known means in the art such as concentrative ultrafiltration or flash evaporation under vacuum at elevated temperatures. Preferably the reduced salt, aqueous solution contains at least about 1.5 milliequivalents polyallylamine polymer per gram of solution ("meq/g"), more preferably at least about 2.0 meq/g, even more preferably at least about 2.5 meq/g, even more preferably at least about 3.0 meq/g, even more preferably at least about 3.5 meq/g, even more preferably at least about 4.0 meq/g, even most preferably at least about 4.5 meq/g polyallylamine polymer. Preferably the reduced salt, aqueous solution contains less than or equal to about 9.0 meq polyallylamine polymer per gram of solution, more preferably less than or equal to about 8.5 meq/g, more preferably less than or equal to about 8.0 meq/g, more preferably less than or equal to about 7.5 meq/g, more preferably less than or equal to about 7.0 meq/g, more preferably less than or equal to about 6.5 meq/g, and most preferably less than or equal to about 6.0 meq/g polyallylamine polymer.

The cross-linking agent and aqueous solution of the polyallylamine, preferably concentrated aqueous solution of the polyallylamine are mixed together, preferably at about room temperature and allowed to react. Examples of suitable cross-linking agents include acrylol chloride, epichlorohydrin, butanedioldiglycidyl ether, preferably 1,4 butanedioldiglycidyl ether, ethanedioldiglycidyl ether preferably 1,2 ethanedioldiglycidyl ether, 1,3-dichloropropane, 1,2-dichloroethane, 1,3-dibromopropane, 1,2-dibromoethane, succinyl dichloride, dimethylsuccinate, toluene diisocyanate, and pyromellitic dianhydride. A preferred cross-linking agent is epichlorohydrin because of its low cost. Epichlorohydrin is also advantageous because of its low molecular weight and hydrophilic nature, maintaining the water swellability and phosphate-binding efficacy of the resulting polyallylamine polymer gel.

When used in therapeutic applications, such as sequestration of bile acids or the binding of phosphate in the gastrointestinal tract, the level of cross-linking makes the polymer insoluble and substantially resistant to absorption and degradation. Preferably, the cross-linking agent is present in an amount from about 0.1 weight percent, more preferably from about 0.5 weight percent, even more preferably from about 1.0 weight percent, even more preferably from about 2.0 weight percent and most preferably from about 5.0 weight percent, weight percent based on the combined weight of (partially) neutralized polyallylamine polymer and cross-linking agent. Typically, the cross-linking agent is present in an amount less than or equal to about 75 weight percent, more preferably in an amount less than or equal to about 50 weight percent, even more preferably in an amount less than or equal to about 25 weight percent, even more preferably in an amount less than or equal to about 20 weight percent and most preferably in an amount less than or equal to about 10 weight percent, based on the combined weight of (partially) neutralized polyallylamine polymer and cross-linking agent.

The cross-linking reaction can be run in any suitable vessel or reactor. A preferred reactor is one in which the reaction can be run batch-wise or in a continuous fashion. More preferred is a reactor designed for high viscosity processing which has agitation means capable of mixing the reactants prior to gelation and breaking the gel into small pieces or crumb after gelation. An example of a preferred reactor designed for high viscosity processing is a LIST-DISCOTHERM B manufactured by LIST Inc. 42 Nagog Park, Acton, Mass. 01720, USA.

The LIST-DISCOTHERM B can be supplied for batch or continuous operation. It is particularly useful for thermal processes such as drying or reactions, where mixing or kneading is necessary to process viscous, pasty, crusting or gelatinous materials such as cross-linked polyallylamine polymer.

The basic unit consists of a horizontal, cylindrical housing, and a concentric agitator shaft with disc elements perpendicular to the axis carrying peripheral mixing/kneading bars. Stationary hook-shaped bars set in the shell interact with, and clean, the shaft and disk elements as they rotate. Shell, shaft, and disc elements, all of which contribute to heat transfer can be heated or cooled. The unit generally operates with a fill level of 60 to 75 percent reactor capacity. Typical shaft speeds range from 5 to 100 rotations per minute ("rpm") with high installed torque. The combined effect of the intensive mixing and kneading action and the self cleaning of the heat exchange surfaces results in high heat and mass transfer rates. In batch units the mixing bars are arranged to perform optional mixing. For continuous operation, the arrangement of the internal geometry provides a forward plug flow movement of the material. However, the axial conveying rate is nearly independent of agitator rotation speed, making it possible to operate at high agitator rotation speeds optimizing heat and mass transfer. Furthermore, the positioning of the disc elements enables the processing of liquid feed stocks directly through to a solid free flowing material without recycling of dry product. The unique design of the LIST reactor eliminates the formation of a single, continuous, congealed mass. As gelation occurs, the self-wiping concentric agitator shaft and disc elements create easy to handle clumps of gel.

The mixture of cross-linking agent and the reduced salt, aqueous solution of the polyallylamine is agitated, preferably between about 60 to about 100 rpm, more preferably about 80 rpm until the mixture has gelled. Once the mixture has gelled, the reaction is allowed to continue, a process sometimes referred to as cure. During curing, the rate of agitation is decreased, made intermittent or discontinued to minimize shear degradation of the cross-linked polymer, preferably agitation is continuous and/or intermittent (on/off) at about 20 rpm. Preferably during curing the reaction temperature is increased, for example to between about 70 to 80° C., for an extended period, for example from 5 to 20 hours.

Unreacted or minimally reacted starting materials are sometimes referred to as soluble oligomers. Shear degraded cross-linked polyallylamine polymer is another source of soluble oligomers. Cross-linked polyallylamine polymer is particularly susceptible to shear degradation resulting from the arduous clean-up procedures required to remove salt from the polymer. Soluble oligomers are undesirable in the final cross-linked polyallylamine polymer. Preferably, the cross-linked polyallylamine polymer is washed to remove undesirable soluble oligomers. Any medium may be used as long as the cross-linked polyallylamine is not soluble in it while the soluble oligomers are soluble in the medium. Preferably, water, one or more alcohols such as methanol, ethanol, propanol, isopropyl alcohol, and the like, and mixtures of one or more of these are used as the wash medium. The cross-linked polyallylamine polymer may be washed one or more times to reduce the soluble oligomers to a desired level. If soluble oligomers are present in the final cross-linked polyallylamine polymer, preferably they are present in an amount less than about 1 weight percent, more preferably in an amount less than about 0.8 weight percent, more preferably in an amount less than about 0.6 weight percent, and most preferably in an amount less than about 0.5 weight percent based on the weight of the cross-linked polyallylamine polymer.

The cross-linked polyallylamine polymer is then separated from the aqueous solution and dried by any suitable means. For example, the cross-linked polyallylamine polymer can be separated from the aqueous solution by filtration or centrifugation then dried in a vacuum oven or a LIST dryer. After filtering to remove the free liquid, the gel enters a dryer at a concentration of 5 to 60% solids. Preferably, the cross-linked polyallylamine polymer is dried under vacuum at a temperature less than about 80° C. The dried cross-linked polyallylamine polymer is preferably ground by any suitable method, for example mortar and pestle, a Retsch Mill, or a FitzMill.

During the above drying step, once the gel is dried to a certain volatile content (dependent on temperature), it becomes extremely cohesive and sticks to itself. This cohesive phase results in significantly increased power requirements necessary to rotate the agitator and a decreased heat transfer efficiency from the heated dryer shell. As a result of these problems, drying times become extended and significant decreases in productivity are realized. The addition of low levels of surfactant to the wet gel before drying decreases the cohesiveness of the gel. Accordingly, important productivity advantages, including faster drying rate and the ability to increase dryer loading to full capacity without resulting in physical damage to the dryer are realized. Preferably, a surfactant such as MICRO-90 concentrated cleaning solution at concentrations of from about 1600 to about 2500 parts per million (ppm) based on dry product weight or stearic acid at a concentration of from about 10 to about 1000 ppm based on dry product weight is added to the wet gel. More preferably, stearic acid is added in an amount of from 75 to about 125 ppm based on dry product weight to the wet gel. Most preferably, stearic acid in amount of 100 ppm based on dry product weight is added to the wet gel. MICRO-90 is a mixture of four different ingredients in water, including both anionic and nonionic surfactants. Specifically, MICRO-90 comprises a mixture of glycine, N,N'-1,2-ethanediylbis-N-(carboxymethyl)-, tetrasodium salt in a concentration of less than 20%; benzenesulfonic acid dimethyl-, ammonium salt in a concentration of less than 20%; benzenesulfonic acid dodecyl-, compounded with 2,2',2"-nitrilotris (ethanol) in a concentration of less than 20%; and poly(oxy-1,2-ethanediyl), alpha-(undecyl)-omega-hydroxy in a concentration of less than 20%. The remainder of the mixture is comprised of water. MICRO-90 is available commercially from the manufacturer, International Products Corporation, Burlington, N.J., USA. Stearic acid is an anionic surfactant that is preferably dissolved in isopropanol before addition to the dryer.

To illustrate the practice of this invention, examples of preferred embodiments are set forth below. However, these examples do not in any manner restrict the scope of this invention.

EXAMPLES

Cross-linked polymers were prepared according to the following procedure. First, an aqueous solution of a polyallylamine polymer was reacted with an epichlorohydrin cross-linking agent to give a cross-linked polyallylamine polymer. The polyallylamine polymers used in the Examples comprised aqueous solutions of poly(allylamine hydrochloride) having a $MW_w$ of about 17,000 daltons. The polyallylamine polymers are available commercially from Aldrich Chemical Company, Inc., 1001 West Saint Paul Avenue, Milwaukee, Wis., USA. The aqueous solution of cross-linked polyallylamine polymer was then washed with an isopropanol/water solution. These "wet" cross-linked polyallylamine polymers were then used to test the effectiveness of adding a surfactant to the wet polymer before drying.

Drying was performed in a LIST DISCOTHERM B 6.3 liter batch processor. The core of the LIST is a 6" horizontal cylindrical shell in which rotates a shaft fitted with disc elements and mixing bars. Stationary counter hooks on the inside of the shell interact with the rotating bars and discs providing a mixing/kneading action which eliminates product buildup and results in a self-cleaning system. A 10 horsepower hydraulic power unit drove the agitator. Dowtherm J heat transfer fluid was used to heat the hollow shell and shaft, and a 3 horsepower Siemen & Hinsch liquid-ring vacuum pump was used to control the system vacuum level.

Example 1

Isopropanol-wet cross-linked polyallylamine polymer was produced following the procedure described above. After flushing the dryer with hot water for several hours, the gel was loaded into the dryer. While agitating at 20 rpm the gel was dried at a jacket temperature of 80° and a vacuum level of 50mm Hg for 3 hours and unloaded.

Example 2

Isopropanol-wet cross-linked polyallylamine polymer was produced following the procedure described above. The dryer was thoroughly cleaned with hot water for several hours. 1.0 g of MICRO-90 was diluted in 20 g of deionized (DI) water and added to the LIST before loading the gel. While agitating at 20 rpm the gel was dried at a jacket temperature of 80° and a vacuum level of 50mm Hg for 3 hours and unloaded.

Example 3

Isopropanol-wet cross-linked polyallylamine polymer was produced following the procedure described above. After flushing the dryer with hot water for several hours, the gel was loaded into the dryer. While agitating at 20 rpm the gel was dried for 5 hours and unloaded. The jacket temperature was set to 60° C. for 1 hour, then 70° C. for 1 hour, and then 80° C. for 3 hours. The vacuum level was set to 200 mm Hg for 2 hours and then 100 mm Hg for 3 hours.

Example 4

Isopropanol-wet cross-linked polyallylamine polymer was produced following the procedure described above. The dryer was flushed with hot water for several hours. 0.035 g of solid stearic acid was dissolved in 10 g of isopropanol and added to the LIST before loading the gel. While agitating at 20 rpm the gel was dried for 5 hours and unloaded. The jacket temperature was set to 60° C. for 1 hour, then 70° C for 1 hour, and then 80° C. for 3 hours. The vacuum level was set to 200 mm Hg for 2 hours and then 100 mm Hg for 3 hours.

Table 1 of Results:

| Example # | Gel Loaded (g) | % solids | Surfactant added | Cohesive | Max Agitator Pressure (psi) |
|---|---|---|---|---|---|
| 1 | 765 | 48.2 | None | yes | 250 |
| 2 | 770 | 48.2 | 1.0 g MICRO-90 | no | 50 |
| 3 | 891 | 45.1 | None | yes | 280 |
| 4 | 906 | 45.1 | 0.035 g stearic acid | no | 45 |

The cohesive phase in examples 2 and 4 was confirmed by visual observation through a sight-glass and by the increase in maximum agitator hydraulic pressure for the untreated samples.

As can be seen, addition of small amounts of surfactant to the wet gel achieved remarkable decreases in maximum agitator pressure. As a result, power requirements for the dryer were reduced and productivity advantages such as increasing dryer loading to full capacity become possible.

The dried gel from examples 3 and 4 was screened with successively finer mesh sieves using an Allen-Bradley L3 series Sonic Sifter, available commercially from Thomas Scientific, 99 High Hill Road @I-295, PO Box 99, Swedesboro, N.J. 08085 USA at an amplitude setting of 7 for 10 minutes. The results are summarized in Table 2 below. The mesh sizes indicated in Table 2 are equivalent to the alternate sieve designation sizes described in Table 21-6 of Perry's Chemical Engineers' Handbook, 6$^{th}$ Ed., 1984, p. 21–15. According to that reference, an 18 mesh sieve would comprise a series of 1 mm openings, with higher mesh sizes designating smaller openings, all the way down to a 149 micron opening for the 100 mesh designation.

As can be seen, agglomeration of the gel into bigger particles that increase the incidence of clogging and slow production is most obvious during the first separation cut at 18 mesh. 76.58% of all particles were retained on the untreated side, as opposed to 28.7% of all particles on the surfactant treated side. At the 40 mesh level, a cumulative 96.24% of all particles were retained on the untreated side, compared to 57.3% of all particles on the surfactant treated side. These retention levels demonstrate that the surfactant treated gel produces a substantially lower number of large particles, resulting in reduced cohesiveness of the dried gel.

TABLE 2

| Screen (mesh) | % Retained Ex. #3 | % Retained Ex. #4 |
|---|---|---|
| 18 | 76.58% | 28.7% |
| 40 | 19.66% | 28.6% |
| 50 | 3.07% | 17.2% |
| 60 | 0.00% | 8.6% |
| 70 | 0.01% | 4.4% |
| 100 | 0.34% | 12.1% |
| Fines | 0.35% | 0.5% |

The following analytical procedures were run on the cross-linked polyallylamine polymers of Examples 1–4:

Swell is determined by placing 0.1 g of dry polyallylamine polymer into a two piece centrifuge tube and stirring with 5 ml of water for two hours. Thereafter the slurry is centrifuged and the resultant gel mass weighed to yield swell:

Swell=(mass final−mass initial)/mass initial.

The centrifugate (extract) from the swell is used for the determination of both soluble oligomers and sodium chloride concentration.

Soluble oligomers (SO) are determined by a modification of the method published by McLean (J. D. McLean, V. A. Stenger, R. E. Reim, M. W. Long and T. A. Hiller, Anal. Chem., 50, 1309 (1978) in which a portion of the extract is derivatized with formaldehyde and then determined polarographically by the reduction of the Schiff's base and compared to a spiked sample.

Phosphate binding capacity ("$PO_4$") is determined by a method similar to that published in U.S. Pat. No. 5,496,545 with the exception that detection was by chromatographic rather than spectrophotometric techniques.

Analytical results:

| Example | Phosphate Binding | Swell Index | Soluble Oligomers |
|---|---|---|---|
| 1 | 5.69 | 7.06 | 1106 |
| 2 | 5.56 | 6.87 | 1067 |
| 3 | 5.64 | 7.05 | 234 |
| 4 | 5.54 | 7.27 | 197 |

As can be seen, the levels of soluble oligomers were unchanged as a result of the addition of surfactants to the wet gel. Further, the water swellability and phosphate-binding efficacy of the resulting polyallylamine polymer gel were also maintained. This demonstrates that addition of surfactants to the wet polymer gel has no negative impact on the functional characteristics of the resulting product.

What is claimed is:

1. A process for producing a cross-linked polyallylamine polymer having reduced cohesiveness comprising the steps of:

(a) reacting an aqueous solution of a polyallylamine polymer with a multifunctional cross-linking agent to give a cross-linked polyallylamine polymer;

(b) washing the aqueous solution of cross-linked polyallylamine polymer with an alcohol/water solution;

(c) adding a cohesion-reducing amount of surfactant to the washed cross-linked polyallylamine polymer;

(d) drying the cross-linked polyallylamine polymer;

(e) grinding and sieving the cross-linked polyallylamine polymer; and (f) isolating the cross-linked polyallylamine polymer.

2. The process of claim 1 further comprising the step of partially neutralizing the aqueous solution of polyallylamine polymer by ion exchange or electrodeionization before reacting the aqueous solution of a polyallylamine polymer with a multifunctional cross-linking agent.

3. The process of claim 2 further comprising the step of or ultrafiltering the aqueous solution of polyallylamine polymer after partially neutralizing the aqueous solution of polyallylamine polymer by ion exchange or electrodeionization.

4. The process of claim 1 further comprising the steps of:
  (a) partially neutralizing the aqueous solution of polyallylamine polymer with a suitable base; and
  (b) ultrafiltering the partially neutralized, aqueous solution of polyallylamine polymer to give the aqueous solution of polyallylamine polymer.

5. The process of claim 4 wherein the base is sodium hydroxide.

6. The process of claim 1 further comprising the step of concentrating the aqueous solution of polyallylamine polymer.

7. The process of claim 1 wherein the step of drying the cross-linked polyallylamine polymer is carried out under reduced pressure.

8. The process of claim 1 wherein the reaction occurs in a reactor designed for high viscosity processing.

9. The process of claim 8 wherein the reactor is a LIST reactor.

10. The process of claim 1 wherein the cross-linking agent is present in an amount from about 0.1 to about 75 weight percent based on the combined weight of polymer and cross-linking agent.

11. The process of claim 1 wherein the cross-linking agent is present in an amount from about 2 to about 20 weight percent based on the combined weight of polymer and cross-linking agent.

12. The process of claim 1 wherein the cross-linking agent is selected from the group of acrylol chloride, epichlorohydrin, butanedioldiglycidyl ether, or ethanedioldiglycidyl ether.

13. The process of claim 1 wherein the cross-linking agent is epichlorohydrin.

14. The process of claim 1 wherein the alcohol is selected from the group of ethyl alcohol, n-propanol, or isopropyl alcohol.

15. The process of claim 1 wherein the alcohol is isopropyl alcohol.

16. The process of claim 1 wherein the surfactant is stearic acid.

17. The process of claim 16 wherein the stearic acid is added in an amount of from about 10 to about 1000 parts per million.

18. The process of claim 17 wherein the stearic acid is added in an amount of from about 75 to about 125 parts per million.

19. The process of claim 18 wherein the stearic acid is added in an amount of 100 parts per million.

* * * * *